(12) United States Patent
Bezugly et al.

(10) Patent No.: US 11,093,152 B2
(45) Date of Patent: Aug. 17, 2021

(54) AUTOMATED STORAGE TIERING BY ACCESS PATTERN DETECTION AND TEMPORAL TREND PREDICTION

(71) Applicant: EMC IP Holding Company LLC, Hopkinton, MA (US)

(72) Inventors: Kirill Aleksandrovich Bezugly, St Petersburg (RU); Nickolay A. Dalmatov, St Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 56 days.

(21) Appl. No.: 16/666,774

(22) Filed: Oct. 29, 2019

(65) Prior Publication Data

US 2020/0233598 A1 Jul. 23, 2020

(30) Foreign Application Priority Data

Jan. 22, 2019 (RU) .......................... RU2019101644

(51) Int. Cl.
*G06F 12/00* (2006.01)
*G06F 3/06* (2006.01)
*G06K 9/62* (2006.01)
*G06N 20/20* (2019.01)

(52) U.S. Cl.
CPC ............ *G06F 3/0644* (2013.01); *G06F 3/068* (2013.01); *G06F 3/0611* (2013.01); *G06F 3/0689* (2013.01); *G06K 9/6267* (2013.01); *G06N 20/20* (2019.01)

(58) Field of Classification Search
CPC ...... G06F 3/0644; G06F 3/0611; G06F 3/068; G06F 3/0689; G06F 12/02; G06N 20/20; G06K 9/6267
See application file for complete search history.

(56) References Cited

U.S. PATENT DOCUMENTS 9,703,664 B1 * 7/2017 Alshawabkeh ......... G06F 3/061
10,360,127 B1 7/2019 McSweeney et al.

OTHER PUBLICATIONS

Nickolay A. Dalmatov, et al., "Storage Allocation Techniques Using Logical Region I/O Access Information and Temporal Trend Prediction", U.S. Appl. No. 16/666,789, filed Oct. 29, 2019.

* cited by examiner

*Primary Examiner* — Shawn X Gu
(74) *Attorney, Agent, or Firm* — Muirhead and Saturnelli, LLC

(57) ABSTRACT

Techniques for data storage optimization processing that may include: receiving I/O access information characterizing observed I/O operations directed to a logical address space; analyzing the I/O access information to identify a predicted I/O access distribution expected for the plurality of logical regions of the logical address space at multiple points in time; determining a placement plan specifying placement of data portions of the plurality of logical regions among a plurality of storage tiers; and performing, in accordance with the placement plan, at least one data movement that moves at least a first data portion of a first of the plurality of logical regions from a first of the plurality of storage tiers to a second of the plurality of storage tiers.

16 Claims, 9 Drawing Sheets

AUTOMATED STORAGE TIERING BY ACCESS PATTERN DETECTION AND TEMPORAL TREND PREDICTION

BACKGROUND

Technical Field

This application generally relates to data storage.

Description of Related Art

Systems may include different resources used by one or more host processors. Resources and host processors in the system may be interconnected by one or more communication connections, such as network connections. These resources may include, for example, data storage devices such as those included in the data storage systems, such as data storage arrays. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may issue I/O operations, such as data read and write operations, received at a data storage system. Host systems may store and retrieve data by issuing the I/O operations to the data storage system containing a plurality of host interface units, disk drives (or more generally storage devices), and disk interface units. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

In accordance with one aspect of the techniques herein is a method of performing data storage optimizations comprising: receiving I/O access information characterizing observed I/O operations directed to a logical address space; analyzing the I/O access information to identify a predicted I/O access distribution expected for the plurality of logical regions of the logical address space at multiple points in time; determining a placement plan specifying placement of data portions of the plurality of logical regions among a plurality of storage tiers; and performing, in accordance with the placement plan, at least one data movement that moves at least a first data portion of a first of the plurality of logical regions from a first of the plurality of storage tiers to a second of the plurality of storage tiers. The analyzing step may include determining the predicted I/O access distribution for the logical address space at the multiple points in time; and determining, in accordance with the predicted I/O access distribution at the multiple points in time, the one or more logical regions, and wherein each of the one or more logical regions has predicted I/O access information characterizing I/O operations directed to said each logical region. Each of the one or more logical regions may include data portions having matching predicted I/O access characteristics for a same defined time period, and wherein the predicted I/O access information of said each logical region is in accordance with the matching predicted I/O access characteristics of the data portions includes in said each logical region. The analyzing step may use a first machine learning model to determine the predicted I/O access distribution. Determining the one or more logical regions further may include determining, using a second machine learning model, groups of data portions having matching predicted I/O access characteristics for a same defined time period, wherein each of the groups is one of the plurality of logical regions. Each of the plurality of storage tiers may have associated storage tier characteristics including performance and capability characteristics of physical storage devices of said each storage tier. Determining a placement plan specifying placement of data portions of the plurality of logical regions among a plurality of storage tiers may include determining placement of data portions of each of the plurality of logical regions among the plurality of storage tiers in accordance with the predicted I/O access information for said each logical region and in accordance with the associated storage tier characteristics of each of the plurality of storage tiers. The plurality of storage tiers may include at least one tier of solid state storage devices and wherein the associated storage tier characteristics of said at least one tier may include at least one write endurance characteristic for solid state storage devices of said at least one tier. At least one write endurance characteristic may include one or more of: a write endurance classification for solid state storage devices of said at least one tier, a number of remaining writes expected during a lifetime of a solid state device of said at least one tier, and a current write wear level of a solid state device of said at least one tier. The associated storage tier characteristics of said each tier may include a characteristic indicated a RAID level of RAID groups of physical storage devices configured in said each storage tier. The placement plan may be determined using a machine learning model. The plurality of logical regions may include at least the two logical regions of different sizes. The method may include providing a hint in accordance with the placement plan to a data storage optimizer, wherein the hint indicates that data portions of the first logical region should be stored on the second tier; determining, by the data storage optimizer, whether the first data portion of the first logical region is currently stored on the second storage tier; and responsive to determining that the first data portion of the first logical region is not currently stored on the second storage tier, moving, by the data storage optimizer, the first data portion from the first storage tier to the second storage tier. The plurality of storage tiers may include more than one solid state storage tier. The plurality of storage tiers may include at least one tier of rotating disk drives.

In accordance with another aspect of techniques herein is a computer readable medium comprising code stored thereon that, when executed, performs data storage optimization processing comprising: receiving I/O access information characterizing observed I/O operations directed to a logical address space; analyzing the I/O access information to identify a predicted I/O access distribution expected for the plurality of logical regions of the logical address space at multiple points in time; determining a placement plan specifying placement of data portions of the plurality of logical regions among a plurality of storage tiers; and performing, in accordance with the placement plan, at least one data movement that moves at least a first data portion of a first of the plurality of logical regions from a first of the plurality of storage tiers to a second of the plurality of storage tiers. Analyzing may include determining the predicted I/O access distribution for the logical address space at the multiple points in time; and determining, in accordance with the predicted I/O access distribution at the multiple points in time, the one or more logical regions, and wherein each of the one or more logical regions has predicted I/O access information characterizing I/O operations directed to said each logical region. Each of the one or more logical regions may include data portions having matching predicted I/O access characteristics for a same defined time period, and wherein the predicted I/O access information of said each logical region may be in accordance with the matching predicted I/O access characteristics of the data portions includes in said each logical region. Analyzing may use a first machine learning model to determine the predicted I/O access distribution.

In accordance with another aspect of techniques herein is a system comprising: a processor; and a memory comprising code stored thereon that, when executed, performs data storage optimization processing comprising: receiving I/O access information characterizing observed I/O operations directed to a logical address space; analyzing the I/O access information to identify a predicted I/O access distribution expected for the plurality of logical regions of the logical address space at multiple points in time; determining a placement plan specifying placement of data portions of the plurality of logical regions among a plurality of storage tiers; and performing, in accordance with the placement plan, at least one data movement that moves at least a first data portion of a first of the plurality of logical regions from a first of the plurality of storage tiers to a second of the plurality of storage tiers.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
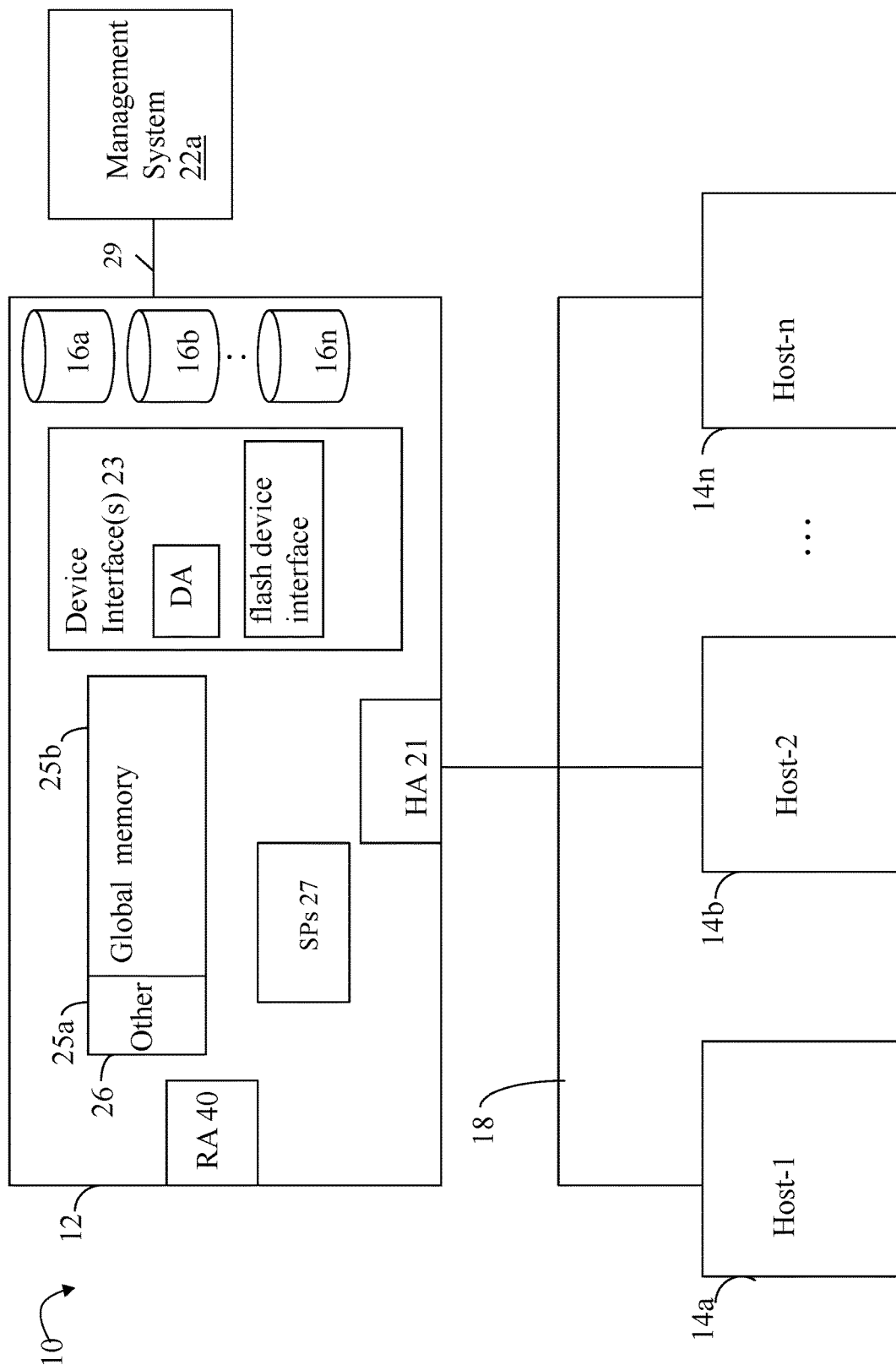
FIG. 1 is an example of components that may be included in a system in accordance with techniques described herein.

Referring to FIG. 1, shown is an example of an embodiment of a system that may be used in connection with performing the techniques described herein. The system 10 includes a data storage system 12 connected to host systems 14a-14n through communication medium 18. The hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrated the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSD may refer to solid state electronics devices as distinguished from electromechanical devices, such as hard drives, having moving parts. Flash devices or flash memory-based SSDs are one type of SSD that contains no moving mechanical parts. For example, at least some of the flash devices may be constructed using nonvolatile semiconductor NAND flash memory. The flash devices may include, for example, one or more SLC (single level cell) devices and/or MLC (multi level cell) devices.

As known in the art, flash devise or drives have an expected lifetime (e.g., as measured in an amount of actual elapsed time such as a number of years, months, and/or days) based on a number of guaranteed write cycles, or program cycles, and a rate or frequency at which the writes are performed. A flash device may be expected to have a usage measured in calendar or wall clock elapsed time based on the amount of time it takes to perform the number of guaranteed write cycles. Thus, flash devices have a wear out or lifetime based on the number of expected writes or erasure cycles prior to failure. Furthermore, PDs of the different SSD media types, such as MLC or SLC, may have different write endurance levels and characteristics.

Within a lifetime or usage period, the amount of writes that each type of flash drive, such as MLC or SLC, may be expected to successfully sustain varies. For example, with SLC, one bit of information or data is stored per cell. In contrast, for example, with MLC, multiple bits of information are stored per cell and wear rate during write operations is greater than with SLC. Thus, during a usage or lifetime period, an SLC device is expected to be able to have a larger number of allowable writes than an MLC device. In this manner, the SLC device may be characterized as a type of flash having a higher write endurance than the MLC device. Furthermore, the SLC device may be generally included in first write endurance classification associated with a first level of write endurance and the MLC device may be generally included in a second write endurance classification associated with a second different level of write endurance. More generally, additional or different SSD media types having different write endurance classifications may be used in an embodiment in accordance with techniques herein.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers) used to interface with the flash drives and/or other non-volatile physical data storage devices 16a-n. The DAs may also be characterized as back end components of the data storage system which interface with the physical data storage devices 16a-n.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a system cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN (s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in FIG. 1 is a management system 22a that may be used to manage and monitor the system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

Generally, techniques herein may be used in connection with any suitable storage system, appliance, device, and the like, in which data is stored.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to FIG. 1, the control commands may be issued from data storage management software executing on management system 22a to the data storage system 12. Such commands may be, for example, to establish or modify data services, provision storage, perform user account management, and the like. For example, commands may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

Data storage systems may include different storage tiers having different types of non-volatile storage media. For example, as noted above, in at least one embodiment, the data storage system may include one or more tiers of rotating disk drives and include a tier of SSD drives (e.g., flash-based storage drives). Data portions may be proactively moved or relocated between different storage tiers. For example, consider a multi-tiered storage system with 3 storage tiers an SSD tier of flash-based drives, a tier of 15K RPM rotating disk drives (hard disk drives (HDDs), and a tier of 10K RPM rotating disk drives (HDDs). The foregoing 3 storage tiers may be ranked based on performance where the SSD tier may be ranked as the highest, the tier of 15K RPM drives ranked second highest and the tier of 10K RPM dries ranked lowest/least in terms of performance. A data portion, such as mapped to a subrange of a LUN logical address space, may be relocated between different ones of the foregoing 3 tiers in an automated fashion based on the activity, temperature, or frequency of access of I/Os to the data portion at various points in time. At a first point in time, the data portion may be accessed frequently for reading and/or writing and may be stored in the SSD tier. At a second later point in time, the data portion's frequency of access may be greatly reduced (e.g., idle) and may be relocated, via demotion, from the SSD tier to a lower performing tier, such as the 10K or 15K RPM tier. At yet a third point in time subsequent to the second point in time, the data portion may be frequently accessed again and may be promoted to a higher performing tier (e.g., relocated from the 10K or 15K RPM tier to the SSD tier). In at least one embodiment, the automated movement of data portions between different storage tiers dynamically over time in accordance with the I/O activity directed to the different data portions may be performed by a data storage optimizer. Such automated movement of data portions between storage tiers may also be referred to as automated storage tiering or auto-tiering performed to improve data storage system performance, such as improve I/O performance.

Figure 2:
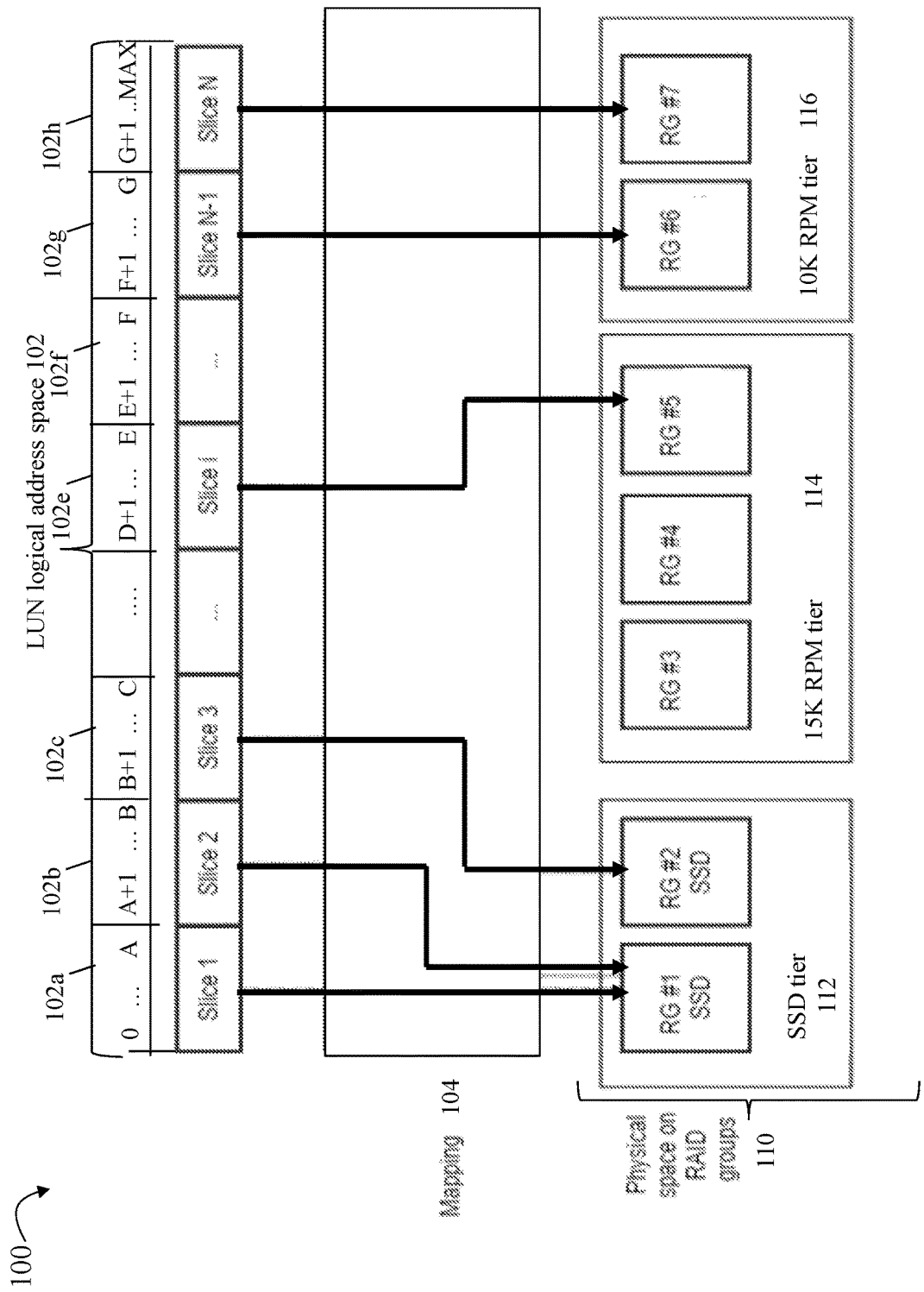
FIG. 2 is an example illustrating mapping of a logical address space to physical storage in a system in an embodiment in accordance with techniques herein.

Referring to FIG. 2, shown is an example illustrating logical to physical mapping in a data storage system. The example 100 illustrates how the logical address space or range of a LUN 102 is mapped via mapping layer 104 to different slices, segments or more generally, portions of physical memory of non-volatile physical storage devices (110) providing back-end data storage, such as denoted by PDs 16a-n in FIG. 1. The example 100 include storage tiers 112 (SSD tier), 114 (15K RPM tier) and 116 (10K RPM tier) comprising the PDs 110 as noted above. Element 102 may denote the LUN's logical address space, having a starting logical address, block or offset of 0, and an ending maximum logical address, MAX. The LUN's logical address space 102 in the example 100 is partitioned into equal logical address space portions (denoted by 102a-h) where each of the portions 102a-h is mapped to a portion of physical storage, also referred to as slices or segments, on the different PDs of different ones of the storage tiers of 110. As noted above, data storage system software may periodically remap data stored in different logical portions of the LUN's logical address space to keep the most actively used or accessed portions of 102a-n on slices of the highest performance tier 112 in efforts to maximum data storage system I/O performance. As shown in FIG. 2, PDs of the tiers 112, 114 and 116 may be configured into RAID groups (denoted as RG #1-7 in FIG. 2) each having a suitable RAID level to provide data protection.

In some existing systems not using techniques herein, the automated storage tiering and movement of data between different storage tiers may be based on the I/O activity observed over a time period directed to each individual data portion as stored on physical storage. The I/O activity information may be collected per slice of mapped physical storage. Use of such metrics for I/O activity, such as based on a simple moving average I/O activity for the individual slices, may be insufficient for predicting periodic I/O changes. Additionally, the existing systems not using techniques herein may determine the I/O activity directed to different individual physical storage slices without regard to the associated logical addresses.

To address the above-noted problems and deficiencies, described in following paragraphs and figures are techniques that include analyzing how I/O activity or access is distributed, and may change dynamically over time, with respect to the logical address space associated with data portions. Such analysis may identify changes over time, for example, such as related to changes over time in I/O activity type and workload levels, and changes over time in logical regions accessed (e.g., where the defined logical regions having associated logical address subranges may change over time). Based on such analysis, I/O activity or access patterns and associated trends may be identified and used to predict the expected I/O activity and associated characteristics at different logical address space subranges or regions at different points in time. Such predictions may be used in connection with selecting different storage devices and different storage tiers upon which different data portions of different logical address space regions are placed at different points in time. Each of the identified logical address space regions and associated logical address subrange may be mapped to multiple slices of physical storage within the same storage tier. Data movements or relocations may be performed with respect to an identified logical region where data stored on multiple slices (having corresponding logical addresses in the logical region) may be placed, moved or relocated as a unit among suitable storage tiers.

In at least one embodiment in accordance with techniques herein, physical storage may be allocated and mapped to logical addresses in units referred to as slices, as discussed above. The slices may be of the same size, or of varying sizes, depending on the particular embodiment. In at least one embodiment, the data movement size granularity may also be a single size (e.g., where data is relocated or moved in chunks of the same size) or may be of varying sizes (e.g., where data is relocated or moved in chunks that may be of different sizes), depending on the particular embodiment. The data movement size granularity denotes the unit or size of data chunks moved or relocated between storage tiers, such as by a data storage optimizer as discussed elsewhere herein.

In at least one embodiment, different subranges of the logical address space of a LUN may be accessed by an application based on the particular access patterns of the application. Such logical address subranges may correspond, for example, to different abstract or logical storage objects used by the application. Additionally, different subranges may have different associated I/O access patterns as may vary with the particular logical storage objects and associated uses by the application. For example, a file system including multiple files may be stored on a LUN where each of the different files may be a different storage object having its own I/O access pattern based on how and when the application accesses (e.g., issues I/Os to) such files. Each of the different files may have its data stored in a different subrange of the LUN's logical address space. Thus, techniques herein may be used to analyze how I/O activity or access is distributed and changes dynamically over time in the logical address space of the LUN. Techniques herein may identify the different logical address subranges or regions of the LUN and I/O access patterns associated with the different files of the file system, and use such information to identify trends and predict the expected I/O patterns over time to the different logical address subranges or regions. Data portions in a logical region may be characterized as having matching or similar I/O access characteristics within a same time frame or time period. For example, a logical region corresponding to a file of the file system may be determined in accordance with a logical address subrange having common or similar I/O access characteristics with respect to data portions of the region. Techniques herein may use I/O access predictions to determine placement, movement and relocation of data, that is stored at the different logical address subranges or regions at different points in time, among suitable storage tiers and drives. The foregoing and other aspects of techniques herein are described in more detail in following paragraphs and figures.

In following examples, reference may be made to the logical address space of a single LUN for purposes of illustration of techniques herein. More generally, such techniques may be applied with respect to multiple logical address spaces of multiple LUNs.

Figure 3:
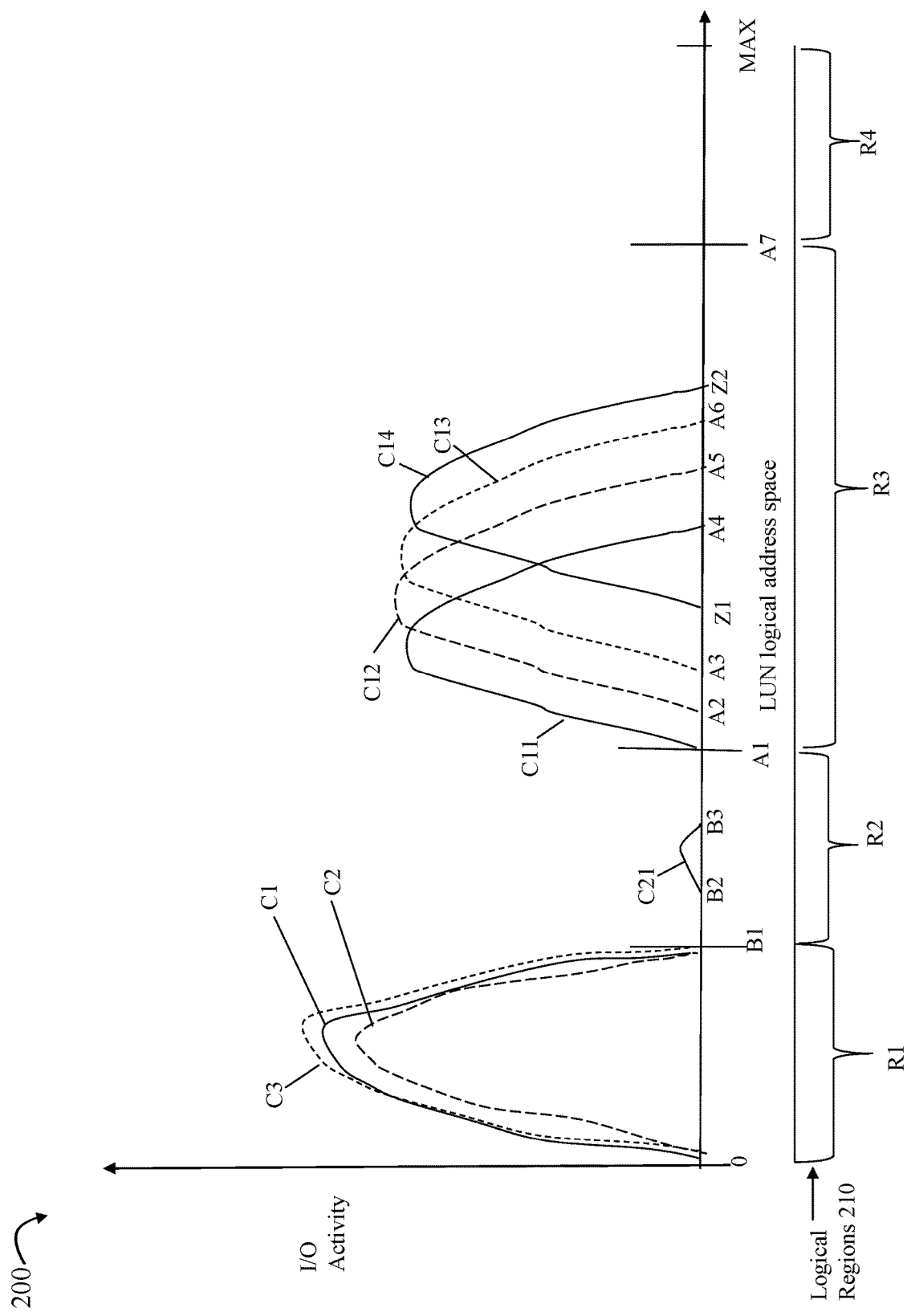
FIGS. 3, 4, 5A and 5B are examples illustrating use of techniques herein in connection with logical address spaces having different logical regions and associated I/O activity or access information across time.

Referring to FIG. 3, shown is an example 200 providing a graphical illustration of an embodiment in accordance with techniques herein. In the example 200, the graph illustrates I/O activity or workload level on the Y axis and the LUN logical address space on the X axis. The LUN logical address space of the X axis is illustrated as ranging from logical address 0 to MAX similar to that as described above (e.g., FIG. 2). The Y axis denotes the level of I/O activity or workload. For example, I/O activity or workload of the Y axis may be a numerical quantity denoting the I/O activity or workload such as in I/Os per second (e.g., I/O rate), read I/O per second amount of data read and/or written per second, and the like. R1, R2, R3 and R4 may denote different logical address space subranges or regions 210 of the LUN's logical address space. In the example 200, R1, R2 and R3 may denote logical address subrange portions to which writes have been issued and therefore include stored user data. R4 may denote an unused logical address subrange to which no writes have yet been issued (e.g., R4 does not include user data/has not been used to store user data). In this example, R1-R4 are illustrated as having different sizes in terms of subranges. Generally, number and size of the logical regions identified using techniques herein may vary with the particular I/O activity observed at different points in time across the LUN logical address space.

The example 200 illustrates the distribution of I/O activity or access over time across the LUN logical address space on the Y axis, as will now be described in more detail.

Curves C1, C2 and C3 may denote the observed I/O activity in logical region R1, respectively, at three subsequent points in time or time periods T1, T2 and T3. Each of the curves C1, C2 and C3 also span the entire logical address subrange, 0 through B1, of logical region R1. C1 indicates the I/O activity in logical region R1 at a first point in time T1 at which I/O activity or access information is collected for a first time period. C2 indicates the I/O activity in logical region R1 at a second point in time T2 (subsequent to T1) at which I/O activity or access information is collected for a second time period. C3 indicates the I/O activity in logical region R1 at a third point in time T3 (subsequent to T2) at which I/O activity or access information is collected for a third time period. In this example, assume that C1, C2 and C3 denote I/O activity for R1 where the I/O activity observed at the points in time indicate that only a large amount of reads/read data (including both sequential and random), but no writes, have been directed to a logical address in the logical address subrange denoted by R1. As such, each of C1, C2 and C3 denote high read I/O activity or workload directed to logical region R1. Based on the collected information C1-C3, respectively, for the time periods T1-T3, it may be observed from the graphical illustration 200 that the I/O access pattern for R1 with only reads, but no writes, has an associated high read I/O workload level or intensity that remains relatively constant during the observed time periods T1-T3 (e.g., approximately the same, within specified threshold conditions such as within a defined range of read activity).

Curve C21 may denote the observed I/O activity in the logical address subrange, B2 through B3, of logical region R2 at point in time or time period T1. Generally C21 indicates a very low level of I/O activity for time period T1. For time periods T2 and T3, the I/O activity or access information may be idle for R2 where no I/Os are directed to any logical address in the logical region R2 (thus no curve is illustrated for R2 for time periods T2 and T3 in this example).

Curves C11, C12 and C13 may denote the observed I/O activity in logical region R3, respectively, at three subsequent points in time or time periods T1, T2 and T3. C11 indicates the I/O activity in the logical address subrange 1, A1 through A4, of logical region R3 at the first point in time T1 at which I/O activity or access information is collected for a first time period. C12 indicates the I/O activity in the logical address subrange 2, A2 through A5, of logical region R3 at the second point in time T2 at which I/O activity or access information is collected for a second time period. C13 indicates the I/O activity in the logical address subrange 3, A3 through A6, in logical region R3 at the third point in time T3 at which I/O activity or access information is collected for a third time period. In this example, assume that C11, C12 and C13 denote I/O activity observed at the points in time indicate that only a high level of writes/write data (including both sequential and random writes), but no reads, have been directed to a logical address in the logical address subrange denoted by R3. As such, each of C11, C12 and C13 denote only high write I/O activity or workload directed to different logical subranges of R3. Based on the collected information C1-C3, respectively, for the time periods T1-T3, it may be observed from the graphical illustration 200 and analysis that the I/O access patterns of only writes, but no reads, has an associated high I/O workload level or intensity that remains relatively constant over the 3 observed time periods T1-T3 (e.g., approximately the same, within specified threshold conditions such as within a defined range of write activity).

Based on such collected I/O activity or access information distributed in time across the LUN logical address space as illustrated in FIG. 3, analysis may determine a trend with respect to the I/O access pattern of logical region R3. Analysis may indicate that the I/O access pattern directed to R3 is writes to different subranges of the logical region R3 which shift or change over time and where each subrange is approximately the same size in terms of logical address span. As time elapses, writes are issued to logical address subranges of R3 where the beginning and ending of the subrange increase with each point in time. For example, it may further be determined that the incremental difference/distance between the starting point A1 of subrange 1 and the starting point A2 of subrange 2 is approximately the same (e.g., within specified threshold) as the incremental difference/distance between starting point A2 of subrange 2 and starting point A3 of subrange 3. Furthermore, it may further be determined that the incremental difference/distance between the ending point A4 of subrange 1 and the ending point A5 of subrange 2 is approximately the same (e.g., within specified threshold) as the incremental difference/distance between ending point A5 of subrange 2 and ending point A6 of subrange 3. As such, trending may use such collected information (e.g., C11, C12 and C13, respectively, from time periods T1, T2 and T3) to predict that at a subsequent point in time T4 (subsequent to T3) the I/O access pattern of writes may be directed to a fourth subrange of the logical region R4. Curve C14 may denote the predicted I/O access pattern of writes for the predicted fourth subrange. The fourth subrange may have a starting logical address, as denoted by Z1, equal to A3 plus an amount determined in accordance with (e.g., average of) the incremental difference/distance between consecutive pairs of starting points of the 3 subranges in R3 as noted above. The fourth subrange may have an ending logical address, as denoted by Z2, equal to A6 plus an amount determined in accordance with (e.g., average of) the incremental difference/distance between consecutive pairs of ending points of the 3 observed logical address subranges in R3 as noted above. Furthermore, analysis may determine that the distance or span of subrange 1 (A4-A1), subrange 2 (A5-A2) and subrange 3 (A6-A3) are all approximately the same (e.g., within a specified threshold or tolerance).

Thus, information collected for the 3 time periods T1-T3 may be analyzed and used to identify and predict the trend for subsequent time periods, such as T4, R3 as noted above. In a similar manner, information collected for time periods T1-T3 may be analyzed and used to predict a trend for R1, for time period 4, which indicates an expected read-only I/O workload that is similar to observed read only I/O workloads C1-C3 observed, respectively, for time periods T1-T3. Information collected for time periods T1-T3 (e.g., curve C21) may be analyzed and used to predict a trend for R2, for time period 4, which indicates generally an expected low or idle I/O workload that is similar to the I/O workloads observed for time periods T1-T3. Similarly, predictions based on the detected trends may be used to generally predict or forecast additional time periods subsequent to T4. For example, based on the trend detected for R3, it may be predicted that writes will be directed to changing or shifting subranges of R3 at time periods T5, T6, and the like, where the subrange logical address span or distance remains approximately the same size over time but shifts further to the right (e.g., increases over time into the higher logical address spaces) as time further elapses.

Based on the foregoing predictions of the expected I/O activity or access for different logical regions of the LUN logical address space that may be determined for time periods T4, T5, and other time periods subsequent to T3, an embodiment in accordance with techniques herein may determine an optimal placement plan of data of the different logical regions across storage tiers, and PDs or RGs thereof. Such placement may be determined prior to subsequent time periods T4, T5, and the like. Processing may be performed prior to time period T4, such as by the data storage optimizer, to perform any necessary data movements/relocations to ensure that data of the different logical regions is placed in storage tiers, and PDs or RGs thereof, in accordance with the placement plan.

Generally, the placement plan to distribute logical regions among the storage tiers may be characterized in one aspect as determining a best suited match between characteristics or attributes of a logical region and characteristics or attributes of candidate storage tiers. For example, characteristics of a logical region relate to I/Os directed to the logical region and may include read I/O access, activity or workload characteristics (e.g., read I/O rate, amount of data read per unit of time, what portion/percentage of reads are sequential, what portion/percentage of reads are random, average read I/O size overall, average read I/O size of random reads, average read I/O size of sequential reads, logical addresses within logical region that are accessed for read I/Os), write I/O access or workload characteristics (e.g., write I/O rate, amount of data written per unit of time, what portion/percentage of write s are sequential, what portion/percentage of write s are random, average write I/O size overall, average write I/O size of random writes (e.g., HDD not preferred for small random writes but may be suitable for larger (e.g., 2 MB) random write access pattern), average write I/O size of sequential writes, logical addresses within logical region that are accessed for write I/Os), physical storage capacity required (e.g., the size of logical region), and overall split or portion of I/Os directed to the logical region that are reads vs. writes. Characteristics of a storage tier may relate to performance and capabilities of the PDs and RAID groups in the tier. For example, characteristics of a storage tier may include performance capabilities of the PD media type of the tier (e.g., relative performance ranking of tier in comparison to other tiers), physical storage capacity of storage tier, write endurance capabilities/characteristics of the tier PDs (e.g., whether PDs are SLC or MLC (may prefer to store high write workload data on SLC having higher write endurance than MLC), current wear level or number of remaining writes in the expected PD lifetime), RAID level or configuration of RAID groups in the storage tier (e.g., RAID-5 or RAID-6 since RAID-5 may be preferred for higher write I/O workload over RAID-6 groups due to additional overhead writes needed for storing additional RAID-6 parity information), and the like. Depending on the particular characteristics or attributes used for the logical regions and storage tiers, a best match or decision may be made to place data of a local region have specified I/O activity or access characteristics on a particular tier (e.g., select target tier having a specified I/O performance capability in accordance with the I/O workload intensity and type of I/Os (e.g., mostly/all reads, mostly/all writes) of a region.

For example, with reference to FIGS. 2 and 3 prior to time period T4, an embodiment may determine to locate or place data of logical region R1 (having predicted high read-only workload) on one or PDs of the highest performance SSD tier 112. Furthermore, since it is predicted that I/Os to R1 will be read-only (no writes) for time period T4, the particular PDs of the SSD tier selected may have a higher amount of wear relative to other PDs not selected. For example, the SSD tier 112 may include two RAID groups, RG1 and RG2 as illustrated in FIG. 2, each configured from PDs of the same media type (e.g., all SLCs, all MLCs). RG1 may be configured from PDs having a higher level of wear than PDs of RG2. Thus, PDs of RG1 have generally already had more writes than PDs of RG2, where, RG1 has an expected remaining lifetime in terms of allowable remaining writes which is less than RG2's expected remaining lifetime in terms of allowable remaining writes. In such a case, since data of R1 is read only, data of logical region R1 may be placed in RG1 of the SSD tier (rather than RG2 of the SSD tier). Additionally, with reference to FIGS. 2 and 3 and prior to time period T4, an embodiment may determine to locate or place data of logical region R3 having a predicted high write-only workload on one or PDs of the highest performance SSD tier 112. Furthermore, since I/Os to R3 are predicted to be write-only for time period T4, the particular PDs of the SSD tier selected may have a lower amount of wear relative to other PDs not selected. For example, assuming the SSD tier includes RAID groups RG1 and RG2 as just described, since data of R3 is write only, data of logical region R3 may be placed in RG2 of the SSD tier (rather than RG1 of the SSD tier) since RG2 has lower wear in terms of writes (e.g., higher remaining number of allowable writes) relative to RG1. Additionally, with reference to FIGS. 2 and 3 and prior to time period T4, an embodiment may determine to locate or place data of logical region R2 on one or PDs of the lowest performance tier, such as the 10K RPM HDD tier 116, due to the predicted low or relatively idle I/O activity for R2.

As a slight variation to having 3 tiers as in FIG. 2, consider and embodiment having an additional 4$^{th}$ tier that is also an SSD tier (e.g., there are 2 SSD tiers and 2 non-SSD tiers of HDDs). In this embodiment, a first SSD tier 1 may include RAID groups of flash drives that are SLC physical media type drives and a second SSD tier 2 may include RAID groups of flash drives that are MLC physical media type drives. In this case, since I/Os directed to R3 are predicted to be a high write-only workload for time period T4, an embodiment in accordance with techniques herein may place or relocate data of R3 on the SSD tier 2 of MLC flash drives (e.g., since MLC drives have a higher write endurance classification than SLC drives). Also, since I/Os directed to R1 are predicted to be a high read-only workload for time period T4, an embodiment in accordance with techniques herein may place or relocate data of R1 on the SSD tier 1 of SLC flash drives (e.g., since SLC drives have a lower write endurance classification than MLC drives).

Additionally, in connection with optimal placement of data such as within a same tier, an embodiment may analyze the predicted I/O access or workload distribution across time for the logical regions to determine which logical regions are predicted to be accessed in parallel at a same point in time, and which logical regions are temporally related (in terms of access) whereby they are predicted to be accessed sequentially. For example, with reference to FIG. 3, assume that data of logical regions R1 and R3 are accessed in parallel and are to be placed in the SSD tier. Due to the parallel access, the optimal placement plan may locate logical regions R1 and R3 on two different PDs to benefit from parallel access to the two PDs. If the SSD tier includes two RAID groups RG1 and RG2, the optimal placement plan may include to place each of R1 and R3 in different RAID groups. As another alternative, if logical regions R1 and R3 are placed in the same RAID group, the optimal placement plan may locate R1 and R3 on different PDs in the same RAID group. As another example, consider two logical regions that are temporally related (in terms of access) whereby they are predicted to be accessed sequentially or consecutively (e.g., not in parallel) and assume that both logical regions are located by the placement plan in the same HDD tier. The placement plan may further indicate to locate the two logical regions on the same HDD, and further, may locate the two logical regions in close physical proximity to one another on the same HDD (e.g., in the same or physical close HDD cylinders to expedite sequential data access on the HDD).

The example 200 of FIG. 3 illustrates how I/Os issued by an application (e.g., such as executing on a host) that are directed to the LUN logical address space may access different logical regions of the logical address space. Each of the different logical regions may have its own I/O activity or access pattern distributed across time. For example, the I/Os issued to region R1 may be read I/Os that read one or more files having data previously written to logical addresses in R1. The I/Os issued to region R3 may be writes or updates to files stored at logical addresses in R3.

In an embodiment in accordance with techniques herein, the foregoing process of collecting I/O activity or access information, identifying access patterns and trends, predicting I/O workload or access distribution in time across the logical address space, determining a placement plan for logical regions, and performing data movements in accordance with the placement plan may be repeated in an ongoing basis. As new data is collected over time, new patterns and/or trends may be identified, and existing patterns and/or trends may be updated and used to determine placement plans for use at different future points in time. Such new or updated patterns and trends may also identify changes, for example, in I/O intensity as well as changes with respect to the defined logical regions accessed at different points in time (e.g., used to identify logical space regions and data thereof that is accessed in parallel or sequentially).

Figure 4:
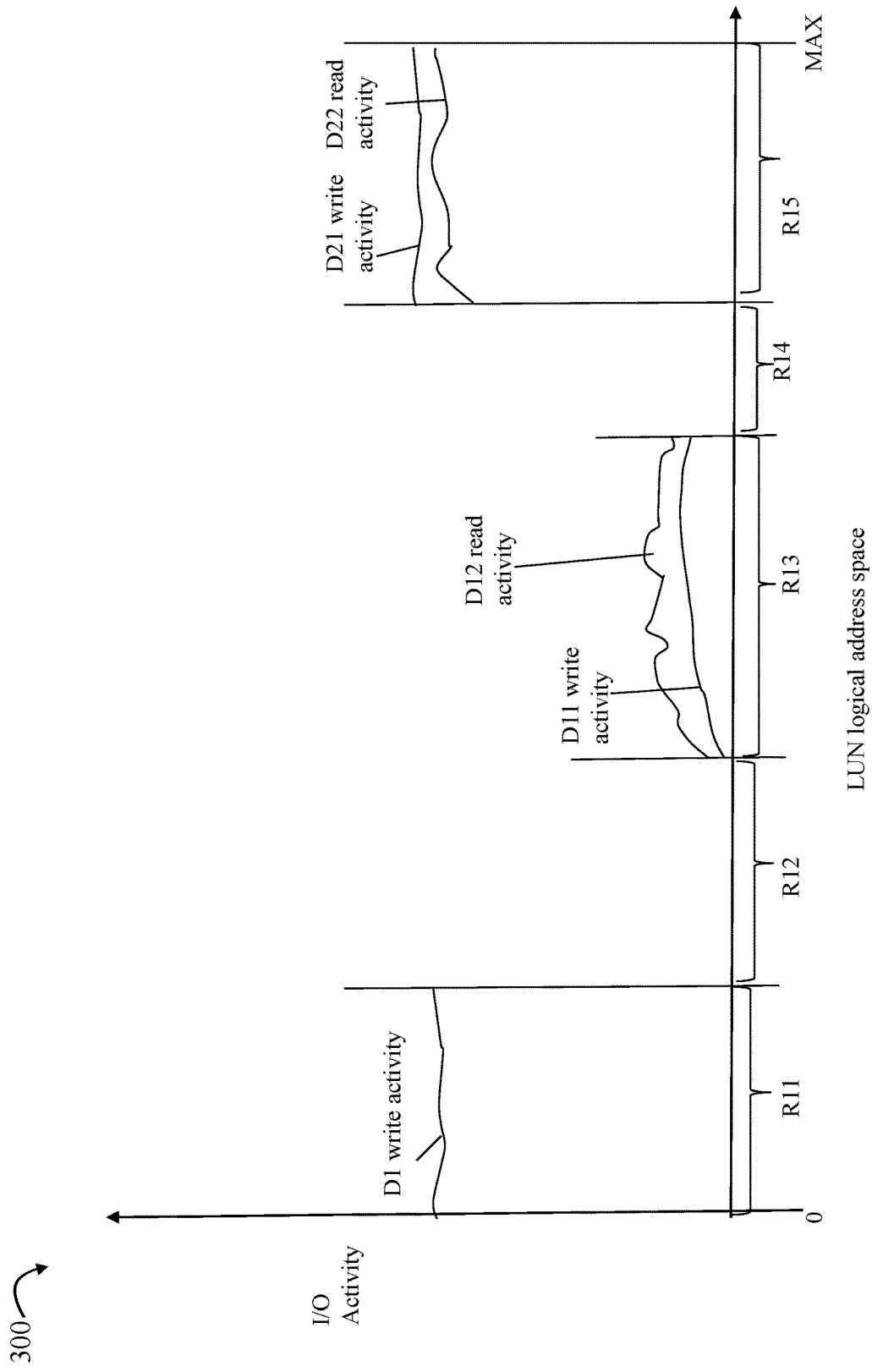

Referring to FIG. 4, shown is another example 300 providing a graphical illustration of an embodiment in accordance with techniques herein. In the example 300, the graph illustrates I/O activity or workload level on the Y axis and the LUN logical address space on the X axis as described in connection with FIG. 3. R11, R12, R13, R14 and R15 may denote different logical address space subranges or regions of the LUN's logical address space. In the example 300, R11, R12 and R13 may denote logical address subrange portions to which writes have been issued and therefore include stored user data. R12 and R14 may denote unused logical address subrange to which no writes have yet been issued (e.g., R12 and R14 do not include user data/have not been used to store user data).

Curve D1 indicates the I/O activity as observed for logical region R11 for time period T1. Additionally, for simplicity of illustration and example, assume the I/O activity observed for R11 for time periods T2 and T3 is approximately the same (e.g., within a specified threshold) as T1 as denoted by D1. D1 indicates a high write only workload directed to R11. Additionally, during time periods T1-T3, no reads are made to R11.

Curves D11 and D12 indicate, respectively, a low to moderate write and low to moderate read I/O activity as observed for logical region R13 for time period T1. Additionally, for simplicity of illustration and example, assume the I/O activity observed for R13 for time periods T2 and T3 is approximately the same (e.g., within a specified threshold) as T1 as denoted by D11 and D12.

Curves D21 and D22 indicate, respectively, a high write and high read I/O activity as observed for logical region R15 for time period T1. Additionally, for simplicity of illustration and example, assume the I/O activity observed for R15 for time periods T2 and T3 is approximately the same (e.g., within a specified threshold) as T1 as denoted by D21 and D22.

Based on such collected I/O activity or access information distributed in time across the LUN logical address space as illustrated in FIG. 4, analysis may be performed in a manner similar to that as described in connection with FIG. 3 to determine predictions (for subsequent time periods) and trends with respect to the I/O access patterns of logical regions. As noted above, for simplicity, analysis may determine that the observed I/O access patterns for each of the logical regions R11, R13 and R15 may be relatively similar for time periods T1-T3.

In a manner similar to that as discussed above with FIG. 3, information collected for time periods T1-T3 illustrated in FIG. 4 may be analyzed and used to predict expected I/O workload or activity for subsequent time periods, as well as to predict and detect trends for logical regions R11-R15 of FIG. 4. Based on the relatively constant I/O workload or access directed to regions R11-R15, analysis may predict and expect the relatively constant I/O workload or access of each of the regions R11-R15 to continue for at least subsequent time periods T4 and T5. For example, for logical region R11, for time periods T4 and T5, it may be predicted that R11 has an expected write-only activity workload similar to D1 (as observed for time periods T1-T3). For logical region R13, for time periods T4 and T5, it may be predicted that R13 has an expected write activity workload similar to D11 an expected read activity workload similar to D12 (as observed for time periods T1-T3). For logical region R15, for time periods T4 and T5, it may be predicted that R15 has an expected write activity workload similar to D21 an expected read activity workload similar to D22 (as observed for time periods T1-T3).

An embodiment in accordance with techniques herein may determine an optimal placement plan of data of the different logical regions R11, R13 and R15 across storage tiers, and PDs or RGs thereof. Such placement may be determined prior to subsequent time periods T4, T5, and the like. Processing may be performed prior to time period T4, such as by the data storage optimizer, to perform any necessary data movements/relocations to ensure that data of the different logical regions is placed in storage tiers, and PDs or RGs thereof, in accordance with the placement plan.

For example, with reference to FIGS. 2 and 4, an embodiment may determine to locate or place data of logical regions R11 and R15 (having high I/O workloads) on one or PDs of the highest performance SSD tier 112, and may determine to locate or place data of logical region R13 (having moderate to low I/O workloads) on one or more PDs of the mid-ranked performance tier, the 15K RPM HDD tier 114. Additionally, since the I/O workload or access directed to R11 is write only, the placement plan may indicate to place R11 data on PDs of RG2 of the SSD tier (rather than RG1 of the SSD tier) since RG2 has lower wear in terms of writes (e.g., higher remaining number of allowable writes) relative to RG1. Also, due to the high write I/O workload of R15, the placement plan may indicate to place R15 data also preferably in RG2 rather than RG1.

The example 300 of FIG. 4 illustrates how I/Os issued by an application (e.g., such as executing on a host) that are directed to the LUN logical address space may access different logical regions of the logical address space. Each of the different logical regions may have its own I/O activity or access pattern distributed across time. For example, the I/Os issued to region R11 may write I/Os written sequentially to a log file stored at logical address subrange for R11. Region R13 may denote a logical address subrange used to store user data as written to a database. As such, the writes and reads directed to R13 may also be random. Region R15 may denote a logical address subrange used to store temporal indices for the database, such as for a relational database. The temporal indices may be written sequentially to logical addresses of R15, where such indices may then be read randomly and sequentially. As known in the art, temporal indices as recorded logically sequentially in R15 provide a time-based tagging or sequential recording of database indices as accessed in sequential time-order.

In an embodiment in accordance with techniques herein, the foregoing process of collecting I/O activity or access information, identifying access patterns and trends, predicting I/O workload or access distribution in time across the logical address space, determining a placement plan for logical regions, and performing data movements in accordance with the placement plan may be repeated in an ongoing basis. As new data is collected over time, new patterns and/or trends may be identified, and existing patterns and/or trends may be updated and used to determine placement plans for use at different future points in time. Such new or updated patterns and trends may also identify changes, for example, in I/O intensity as well as changes in the logical regions accessed.

Figure 5A:
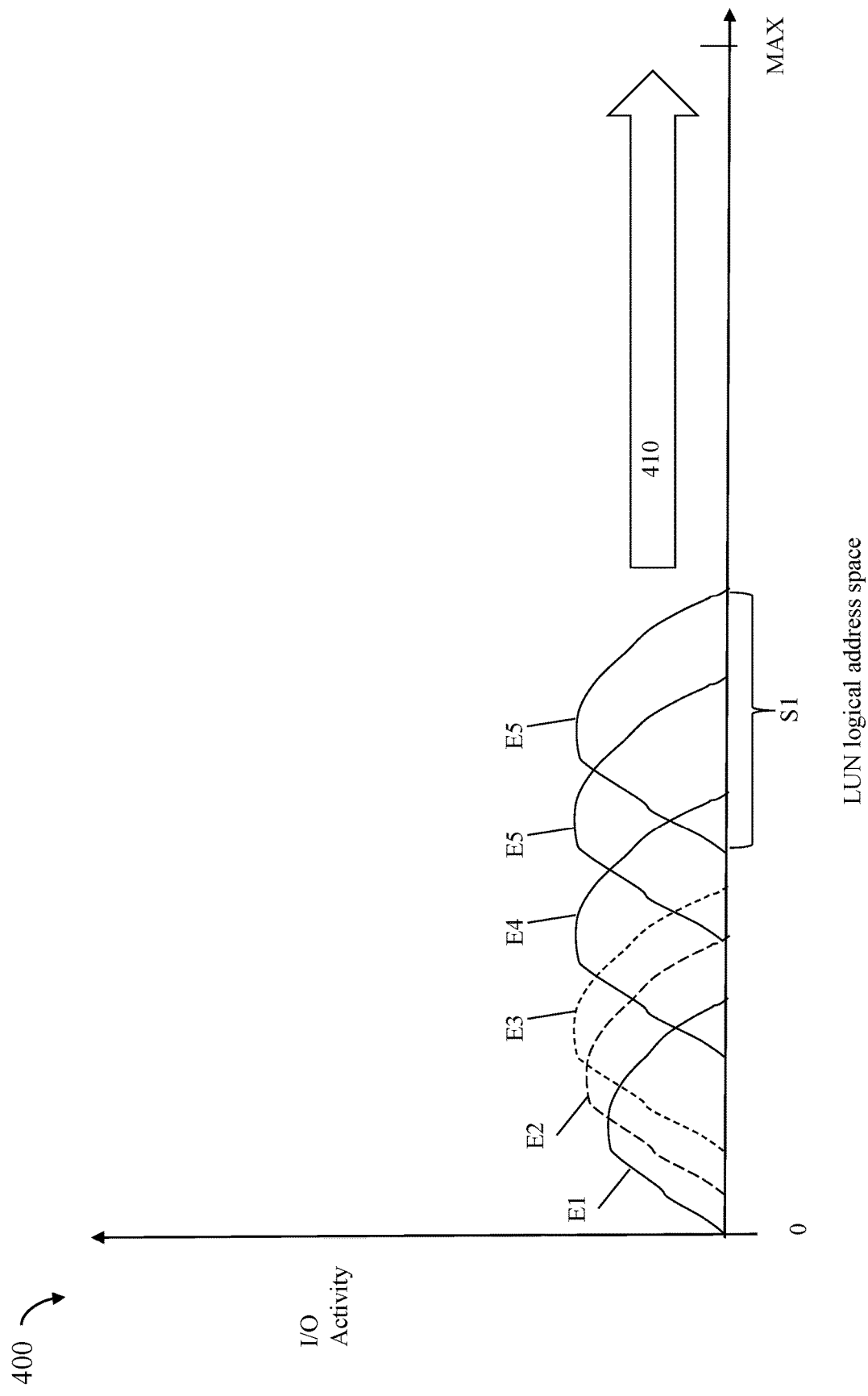

What will now be described is another example in connection with FIGS. 5A and 5B. FIG. 5A may illustrate a first set of I/O workload or access information collected when performing a daily backup to LUN A during evening, or typical non-work hours and FIG. 5B may illustrate a second set of I/O workload or access information collected with respect to LUN A during daytime or typical work hours with respect to LUN A.

Referring to FIG. 5A, shown is an example 400 providing another graphical illustration of an embodiment in accordance with techniques herein. FIG. 5A may illustrate the collected I/O workload or access information across time as distributed over the LUN logical address space when performing a daily backup to the associated LUN A (having the logical address space). In the example 400, the graph illustrates I/O activity or workload level on the Y axis and the LUN logical address space on the X axis as described in connection with FIGS. 3 and 4. Curves E1 through E5 may denote I/O workload or activity observed over 5 sequential time periods, respectively, T1 through T5, such as when performing the daily backup off hours such as during non-work or evening hours (e.g., from 7 p.m. to 5 a.m.). In this example 400, the entire logical address range of the LUN on the Y axis may be determined as single logical region. E1-E5 denote I/O activity observed at the 5 points in time indicate that only a high level of writes/write data (including both sequential and random writes), but no reads, have been directed to a logical address in the logical address subrange. As such, each of E1-E5 denote only high write I/O activity or workload directed to different logical subranges in a manner similar to that as described elsewhere herein in connection with C11, C12 and C13 of FIG. 3. Based on the collected information E1-E5, respectively, for the time periods T1-T5, it may be observed from the graphical illustration 400 and analysis that the I/O access patterns of only writes, but no reads, has an associated high I/O workload level or intensity that remains relatively constant over the 5 observed time periods T1-T5 (e.g., approximately the same, within specified threshold conditions such as within a defined range of write activity).

Based on such collected I/O activity or access information distributed in time across the LUN logical address space as illustrated in FIG. 5A, analysis may determine a trend with respect to the I/O access pattern similar to that as described in connection with R3 of FIG. 3. Analysis may indicate an I/O access pattern of FIG. 5A of writes to different logical address subranges associated with E1-E5, where the logical address subrange shifts or changes over time, and where each subrange is approximately the same size in terms of logical address span. As time elapses during time periods T1-T5, writes are issued to subranges associated, respectively, with E1-E5, where the beginning and ending of the subranges increase with each point in time/time period. Furthermore, analysis may determine that the distance or span of all the subranges associated with E1-E5 are all approximately the same (e.g., within a specified threshold or tolerance).

Thus, information collected for E1-E5 for the 5 time periods T1-T5 may be analyzed and used to identify and predict the trend as noted above for subsequent time periods, such as T6. Such analysis may predict that writes will be directed to changing or shifting subranges at time periods T6, T7, and the like, where the subrange logical address span or distance remains approximately the same size over time but shifts to the right (e.g., increases over time into the higher logical address spaces) as time elapses as denoted by 410. For example, E6 may denote the predicted I/O workload or access for the denoted subrange S6 for subsequent time period T6.

Based on the foregoing prediction of the expected I/O activity or access at S6 of the LUN logical address space that may be determined for time period T6, and similarly other time periods subsequent to T6, an embodiment in accordance with techniques herein may determine an optimal placement plan of data of the different logical regions across storage tiers, and PDs or RGs thereof. Such placement may be determined prior to time periods T6 and subsequent time period(s). Processing may be performed prior to time period T6, such as by the data storage optimizer, to perform any necessary data movements/relocations to ensure that data of the different logical regions is placed in storage tiers, and PDs or RGs thereof, in accordance with the placement plan.

For example, with reference to FIGS. 2 and 5A, an embodiment may determine to locate or place data of S1 (having relatively high write I/O workload), on one or PDs of the highest performance SSD tier 112. Furthermore, since it is predicted that I/Os to S1 will be write-only (no reads) for time period T6, the particular PDs of the SSD tier selected may have a lower amount of wear relative to other PDs not selected. For example, the SSD tier 112 may include two RAID groups, RG1 and RG2 as illustrated in FIG. 2, and described above. PDs of RG1 have generally already had more writes than PDs of RG2, where, RG1 has an expected remaining lifetime in terms of allowable remaining writes which is less than RG2's expected remaining lifetime in terms of allowable remaining writes. In such a case, since data of S1 is write only, data of S1 may be placed in RG2 of the SSD tier (rather than RG1 of the SSD tier) since RG2 has lower wear in terms of writes (e.g., higher remaining number of allowable writes) relative to RG1.

Figure 5B:
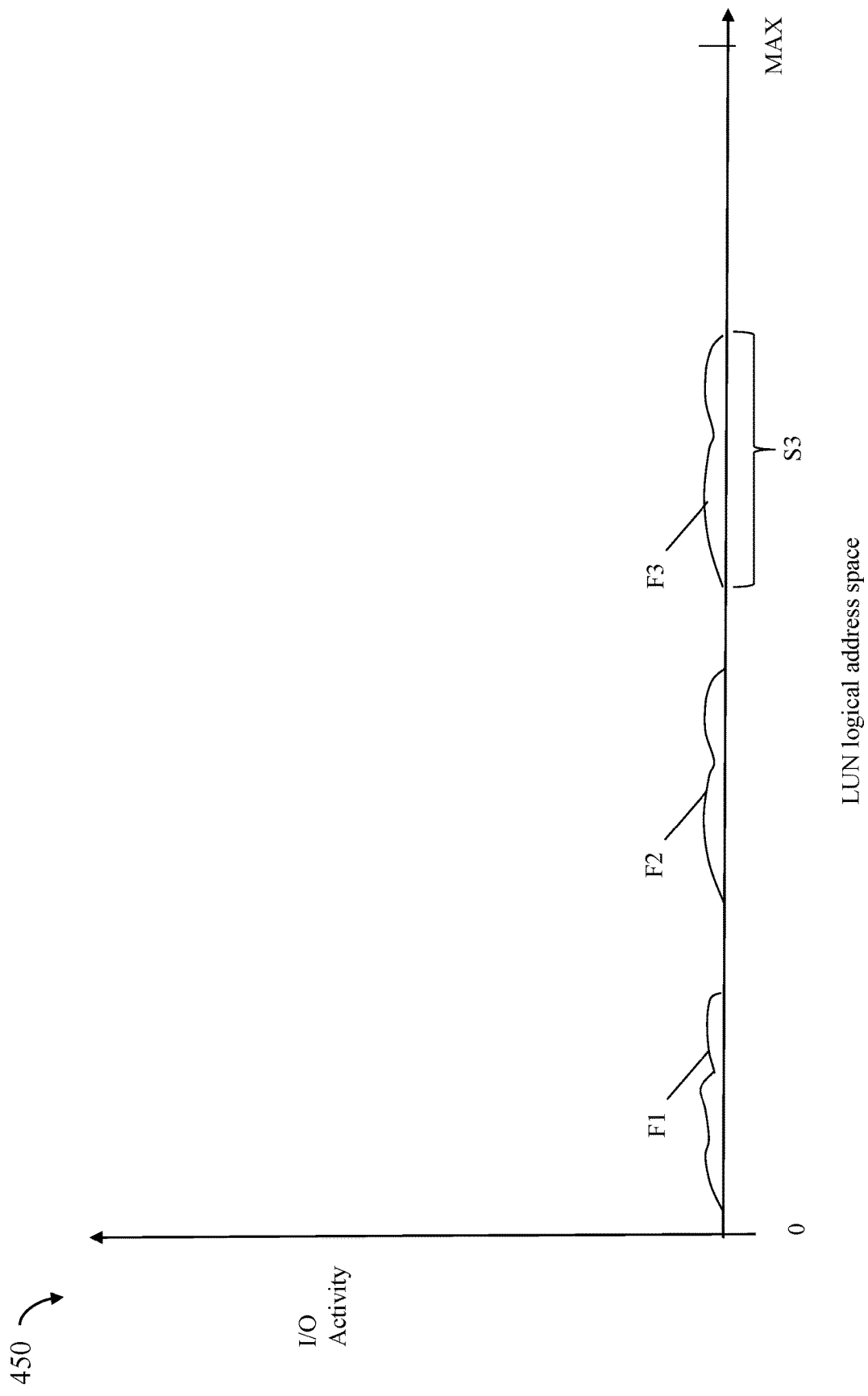

Referring to FIG. 5B, shown is an example 450 providing another graphical illustration of an embodiment in accordance with techniques herein. FIG. 5B may illustrate the collected I/O workload or access information across time as distributed over the LUN logical address space for LUN A during typical day time or work hours (e.g., 5 am to 7 pm) after having completed a daily backup during evening or typical non-work hours (e.g., 7 pm to 5 am). In the example 450, the graph illustrates I/O activity or workload level on the Y axis and the LUN logical address space on the X axis as described in connection with FIGS. 3, 4 and 5A. Curves F1 and F2 may denote I/O workload or activity observed for 2 sequential time periods, respectively, T101 and T102.

In this example 450, the entire logical address range of the LUN on the Y axis may be determined as a single logical region. F1-F2 denote I/O activity observed at the 2 points in time T101 and T102 indicate that a very low level of only reads (including both sequential and random writes), but no writes, have been directed to a logical address in the logical address subrange.

Based on such collected I/O activity or access information F1-F2 distributed in time across the LUN logical address space as illustrated in FIG. 5B, analysis may determine a trend with respect to the I/O access pattern of very low read-only I/O activity at increasing logical address subranges. Thus, information collected for the 2 time periods T101-T102 may be analyzed and used to identify and predict the trend as noted above for subsequent time periods, such as at time period T103. For example, F3 may denote the predicted I/O workload or access for the denoted subrange S3 for subsequent time period T103.

Based on the foregoing prediction of the expected I/O activity or access at S3 of the LUN logical address space that may be determined for time period T103, and similarly other time periods subsequent to T103, an embodiment in accordance with techniques herein may determine an optimal placement plan of data of the different logical regions across storage tiers, and PDs or RGs thereof. Such placement may be determined prior to time period T103 and subsequent time period(s). Processing may be performed prior to time period T103, such as by the data storage optimizer, to perform any necessary data movements/relocations to ensure that data of the different logical regions is placed in storage tiers, and PDs or RGs thereof, in accordance with the placement plan.

For example, with reference to FIGS. 2 and 5B, an embodiment may determine to locate or place data of S3 (having very low I/O workload), on one or PDs of the lowest performance tier, 10K RPM HDD tier 116.

Based on the predicted I/O access or workload information in time, trends and changes in trends may be identified so that prior to commencing backups during typical evening or non-work hours, data for the entire LUN A may be placed into the SSD tier. Additionally, prior to daytime or work hours, data for the entire LUN A may be relocated from the SSD tier to the lowest performance tier, 10K RPM HDD tier 116. Thus, the predicted I/O access or workload distribution across time may be used to identify a predicted first trend in accordance with FIG. 5A during typical evening or non-work hours (e.g., 7 p.m. to 5 a.m.); a predicted second different trend in accordance with FIG. 5B during typical daytime or work hours (e.g., 5 a.m. to 7 p.m.); a first predicted trend change, such as at 7 p.m., when transitioning from daytime work hours to evening non-work hours; and a second predicted trend change such as at 5 a.m., when transitioning from evening non-work hours to daytime work hours.

Continuing with the example in connection with FIGS. 5A and 5B, assume that further additional data collection is performed to obtain I/O workload or access information as distributed in time across LUN A's address space. For example, as described in connection with FIG. 5A, I/O workload or access information as distributed in time across LUN A's address space may be collected for evening or non-work hours over the course of 5 days. Additionally, as described in connection with FIG. 5B, I/O workload or access information as distributed in time across LUN A's address space may be collected for daytime or work hours over the course of same 5 days. From such additional collected data, processing may determine the accuracy of the predicted I/O access or workload information, such as F3 for S3 for time period T103, as compared with respect to the actual observed I/O access or workload information. Also, from such additional collected data, processing may determine the accuracy of the predicted identified trends and predicted changes thereto as compared, respectively to the observed trends and observed points in time at which the trend changes occurred. In this manner in at least one embodiment, the particular technique used to perform any prediction (e.g., of I/O access or workload, trend detection, detect points in time of trend changes) may be revised or modified accordingly based on the additional collected data. It should be noted that such revision or modification to prediction technique or methodology utilized may be similarly performed in connection with other examples herein, such as in FIGS. 3 and 4.

Figure 6:
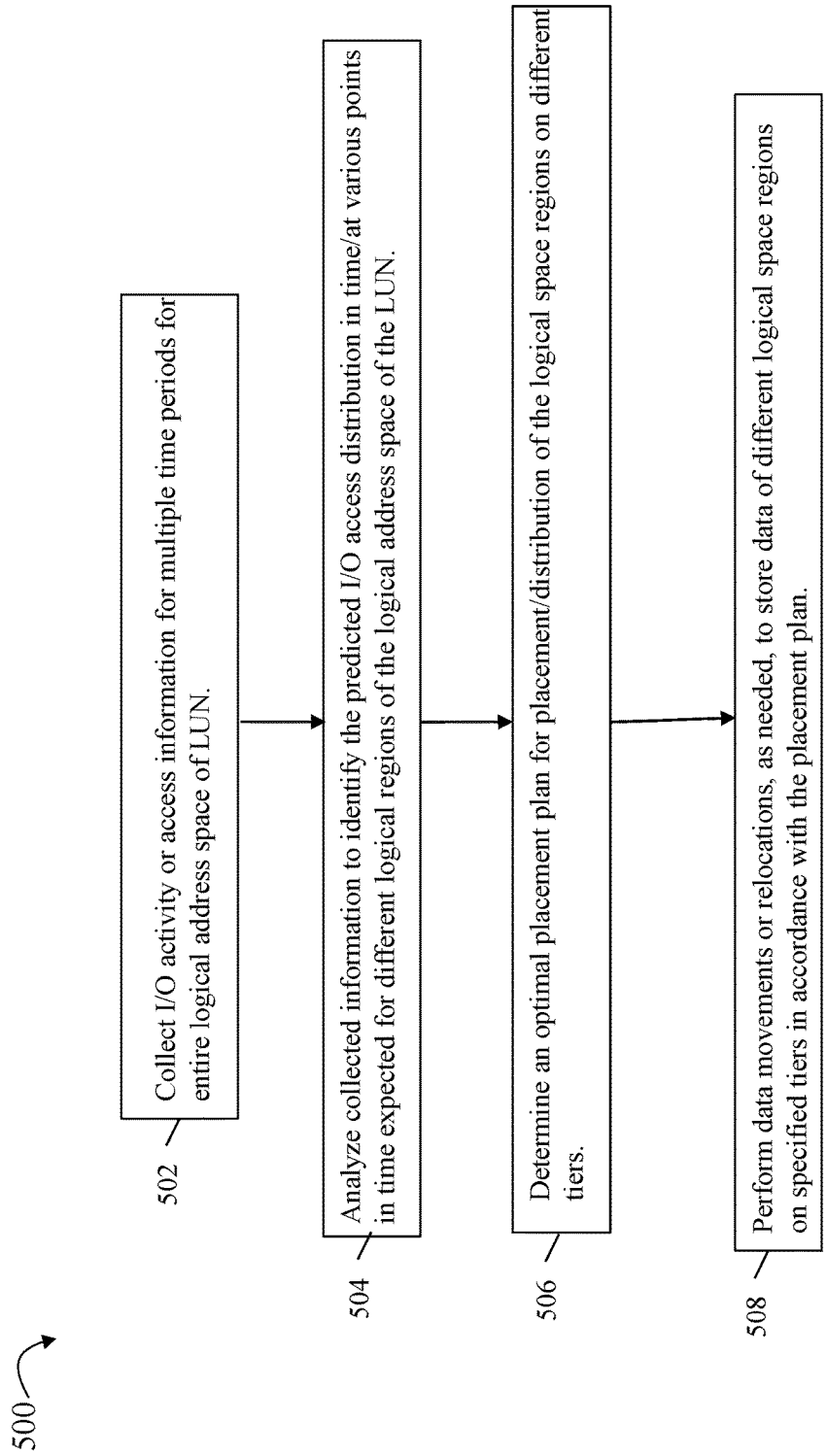
FIG. 6 is a flowchart of processing steps that may be performed in an embodiment in accordance with techniques herein.

Referring to FIG. 6, shown is a flowchart of processing steps that may be performed in an embodiment in accordance with techniques herein. The flowchart 500 summarizes processing as described above. At step 502, I/O activity or access information is collected for multiple time periods for the logical address space of a LUN. For example, with reference to FIG. 3, step 502 may include collecting the different I/O activity or access information such as of C1-C3, C11, C12, C13 and C21 of FIG. 3. From step 502, control proceeds to step 504. At step 504, processing is performed to analyze the collected information from step 502 to identify the predicted I/O access distribution in time (e.g., at various points in time) expected for different logical regions of the logical address space of the LUN. For example, with reference to FIG. 3, step 504 may include predicted curve C14 based on C11, C12 and C13. From step 504, control proceeds to step 506. At step 506, processing is performed to determine an optimal placement plan for placement or distribution of data of the logical address space regions on the different tiers. From step 506, control proceeds to step 508 where data movements or relocations may be performed, as needed, to store data of the different logical space regions on specified tiers in accordance with the placement plan (determined in step 506). As described herein, the processing of FIG. 6 may be periodically repeated.

Figure 7:
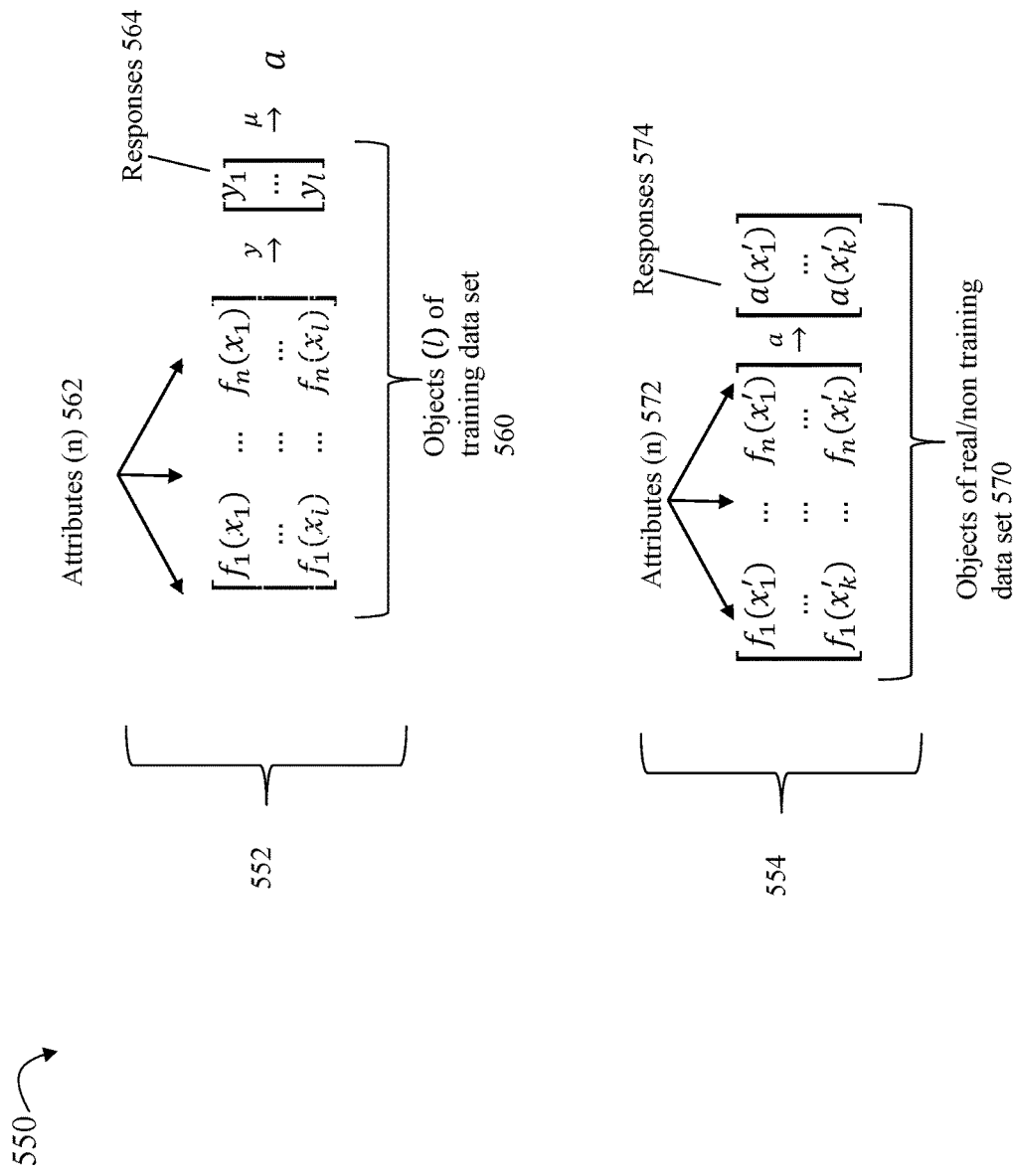
FIG. 7 is an example illustrating the machine learning approach that may be used in an embodiment in accordance with techniques herein.

In at least one embodiment in accordance with techniques herein, one or more machine learning models may be used to perform processing of techniques as described herein, such as summarized in FIG. 6. As known in the art, machine learning may be characterized in one aspect as a method of data analysis that automates analytical model building. Machine learning is based on the idea that systems can learn from data, identify patterns and make decisions. In machine learning, a machine learning model may be trained using $X^l$, denoting a training data set of "1" objects (with known responses), where $X^l = (x_i, y_i)_{i=1}^l$, "$x_i$" denotes the attributes of object "i" of the training data set; and "$y_i$" denotes the response of object "i" of the training data set. A method $\mu$ using the training data set (with known responses) $X^l = (x_i, y_i)_{i=1}^l$ builds algorithm $a = \mu(X^l)$, which can be represented as in 552 of FIG. 7. FIG. 7 is an example illustrating the machine learning approach that may be used in an embodiment in accordance with techniques herein. With reference to 552 of FIG. 7, the objects of the training data set 560 include attributes 562 and responses 564. Each $i^{th}$ row of 562 includes the "n" attributes of object "i" of the training data set 560. Each $i^{th}$ row of 564 includes the known response, $y_i$ of object "i" of the training data set 560. With reference to 554, the algorithm a (representing the trained machine learning model) may be used with real or non-training data set 570 of new objects $x'_i$ where the algorithm a calculates responses $a(x'_i)$ 574 based on attributes 572. Each $i^{th}$ row of 572 includes the "n" attributes of object "i" of the real or non-training data set 570. Each $i^{th}$ row of 574 includes the calculated response, $a(x'_i)$ of object "i" of the real or non-training data set 570.

Examples of particular machine learning models that may be used to perform particular processing steps of techniques herein will now be described with reference to FIG. 8

Figure 8:
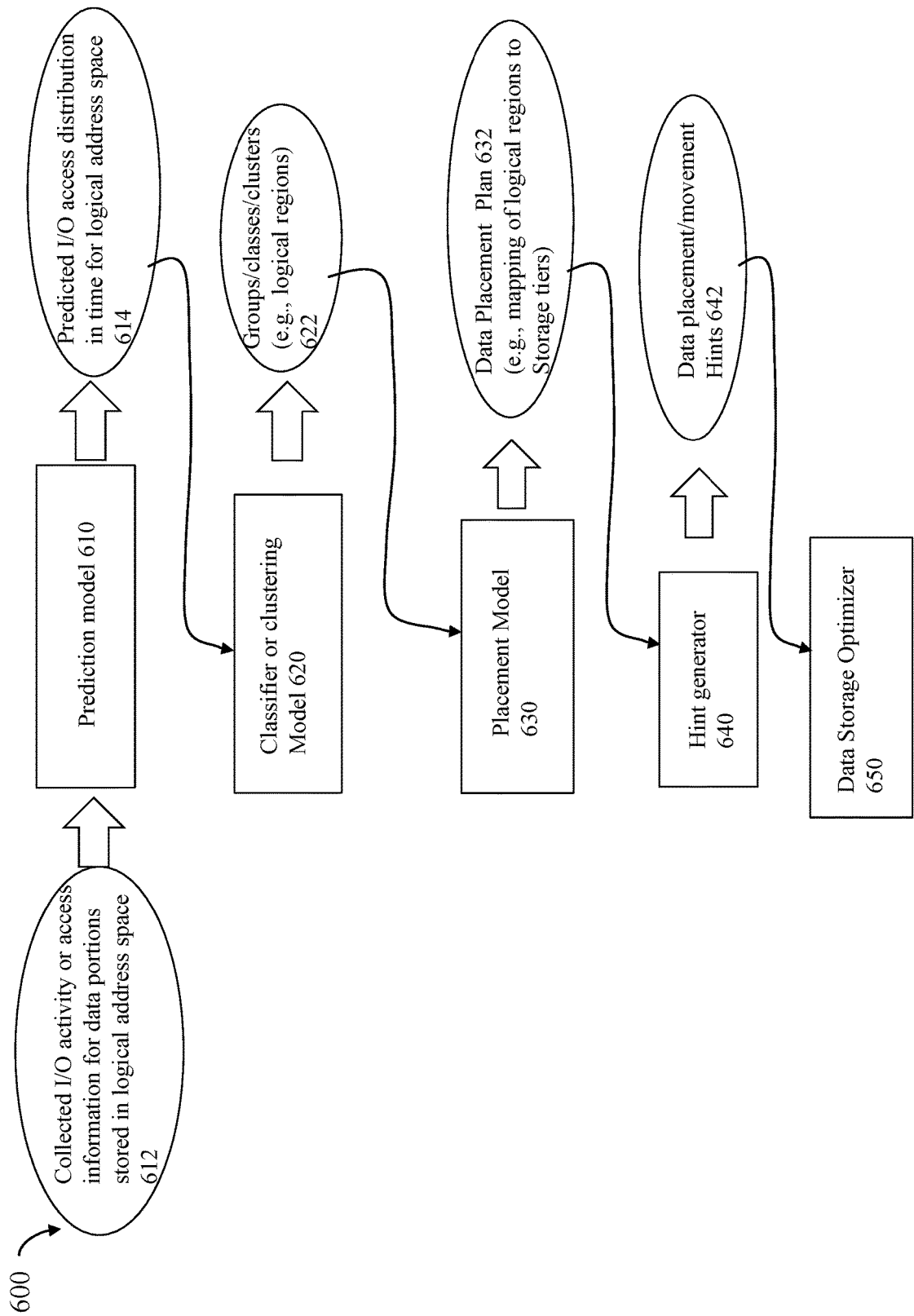
FIG. 8 is an example illustrating different components and associated inputs and outputs that may be used in an embodiment in accordance with techniques herein.

Referring to FIG. 8, shown is an example of components and associated input and outputs that may be used in an embodiment in accordance with techniques herein. In at least one embodiment in accordance with techniques herein, the models 610, 620 and 630 of the example 600 may be machine learning models trained as known in the art and as generally described in connection with FIG. 7. Elements 612, 614, 622 and 632 may denotes set of objects used in connection with machine learning models, as known in the art and generally described in connection with FIG. 7.

In the example 600, collected I/O activity or access information 612 for data portions stored in the logical address space may be provided as an input to the prediction model 610. Using input 612, prediction model 610 generates as an output 614, the predicted I/O access distribution in time for the logical address space. The prediction model 610 may be a first trained machine learning model. In at least one embodiment, the prediction model 610 may be a linear regression machine learning model that performs regression analysis to generate output 614, the predicted I/O access distribution in time for the logical address space. The input 612 may be expressed in terms of objects provided as an input to the prediction model 610. For example, the objects of 612 may be denote I/Os directed to the data blocks or data portions stored in the logical address space for which the predicted distribution 614 is determined. Each of the objects of 612 denoting an I/O operation directed to a data portion stored in the logical address space may include attributes generally characterizing I/O access or activity directed to the data portion. For example, attributes of objects of 612 may include: I/O access type of read or write (e.g., binary attribute, denoting type of I/O directed to the data portion); logical address where data block/data portion is stored (e.g., nominal or named attribute type); and block size denoting the size of the data portion read or written by the I/O operation (e.g., numerical attribute type).

The predicted I/O access distribution 614 may also include objects denoting I/O operations directed to data portions stored in the logical address space. The objects of 614 may include attributes generally characterizing I/O access or activity directed to the data portion. For example, attributes of objects of 614 may include: I/O access type of read or write (e.g., binary attribute, denoting type of I/O directed to the data portion); logical address where data block/data portion is stored (e.g., nominal or named attribute type); block size denoting the size of the data portion read or written by the I/O operation (e.g., numerical attribute type); indication whether I/O is sequential or random (e.g., binary attribute); and indication whether I/O is accessing the data portion in parallel (with another I/O) or consecutive/not in parallel (e.g., binary attribute).

The predicted I/O access distribution 614 may be provided as an input to the classifier or clustering model 620 which generates as an output groups, classes or clusters 622 of objects. In at least one embodiment, the classifier or clustering model 620 may be a trained machine learning model that performs clustering or classification of objects of 614. The model 620 may be a linear discriminant analysis (LDA) model that performs multi-class classification or grouping of I/O operations directed to the data portions based on I/O access characteristics within the same time frame or time period. Such groups or clusters identified may correspond to I/O activity directed to logical regions in the logical address space at different time periods. Data portions located in the same logical region may be characterized as having similar or matching I/O access characteristics within a same defined time period or time frame. In at least one embodiment, objects denoting I/O operations of 614 included in the same group are in the same time period or time frame and also have matching values for all three of the following attributes: I/O access type denoting whether I/O is read or write, indication of I/O operation as sequential or random, and indication of I/O parallel or non-parallel (consecutive). For example, a group may include I/O operations having the following values (respectively) for the foregoing attributes: read, sequential, and consecutive/non-parallel within the same time frame or time period. An embodiment may also take into account different and/or additional attributes, such as block size denoting the size of the data read or written. The block size may be used, for example, in determining the I/O size is small or large (e.g., based on defined thresholds or ranges) and can be used as a characteristic in selecting a suitable storage tier for placement of a logical region's data. Thus, objects included in a group of 622 may denote data portions that are logically related or similar in terms of access time (e.g., same time frame or period) and I/O access characteristics.

The groups, classes or clusters 622 may be provided as an input to the placement model 630 which generates as an output a data placement plan 632. The data placement plan 632 provides a mapping of groups, and thus logical regions, to storage tiers identifying upon which storage tier each logical region should be placed. In at least one embodiment, the placement model 630 may be a machine learning model that distributes the groups 622 for placement among the different storage tiers in accordance with the I/O access characteristics of the groups and performance and capability characteristics of the storage tiers. For example, as described elsewhere herein, such placement may be determined a best match between I/O characteristics of a logical region and a selected storage tier. In at least one embodiment, the data placement plan may identify a list of logical regions or groups to be placed in each storage tier. In at least one embodiment, the placement model 630 may be a support vector machine (SVM) using a pairwise approach. As known in the art, the pairwise approach uses objects identifying a pair of items D1, D2 for which a binary response determination of yes (relevant) or no (not relevant) is made. For example, the pair may identify a group and a tier and the output response may indicate whether the particular tier is relevant (suitable) for storing the group.

The data placement plan 632 may be provided as an input to the hint generator 640 that generates data placement or movement hints 642 in accordance with the data placement plan 632. A data placement or movement hint of 642 may, for example, identify the particular LUN and associated logical address range of a logical region to be placed on a particular storage tier (e.g., as indicated in the plan 632). The data placement or movement hints 642 may be provided to the data storage optimizer 650. The optimizer 650 may perform any necessary data movements among storage tiers to enforce the data placement plan 632 and to ensure that data of logical regions is distributed among the storage tiers as indicated in the data placement plan 632. For example, assume a hint is provided to the optimizer 650 that indicates logical region A1 located at logical address subrange S1 of the LUN A is to be placed on the SSD tier. The optimizer 650 may determine the current storage tier or tiers upon which data portions within logical region A1 are currently stored. If all such data portions of logical region A1 are currently not stored in the SSD tier, the optimizer 650 may perform one or more data movements to place any such data portions of logical region A1 on the SSD tier.

Although particular machine learning models have been described in connection with FIG. 8 in one particular embodiment, generally, any suitable known machine learning model or methodology may be used in an embodiment in accordance with techniques herein. Additionally, processing may be performed to evaluate and compare performance of multiple different machine models to determine which particular model performs better for the different various processing, such as described in connection with techniques herein. For example, such processing may determine whether linear regression model performs better than a neural network model (e.g., which is better predictor) in connection with selecting a prediction model 610. More generally, an embodiment may use any suitable technique in connection with performing processing as described herein.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of performing data storage optimizations comprising:
   receiving I/O access information characterizing observed I/O (input/output) operations directed to a logical address space;
   analyzing the I/O access information to identify a predicted I/O access distribution expected for a plurality of logical regions of the logical address space at multiple points in time, wherein said analyzing includes:
      determining the predicted I/O access distribution for the logical address space at the multiple points in time; and
      determining, in accordance with the predicted I/O access distribution at the multiple points in time, one or more logical regions of the plurality of logical regions, and wherein each logical region of the one or more logical regions has predicted I/O access information characterizing I/O operations directed to said each logical region, wherein each of the one or more logical regions includes data portions having matching predicted I/O access characteristics for a same defined time period, and wherein the predicted I/O access information of said each logical region is in accordance with the matching predicted I/O access characteristics of the data portions included in said each logical region;
   determining a placement plan specifying placement of data portions of the plurality of logical regions among a plurality of storage tiers; and
   performing, in accordance with the placement plan, at least one data movement that moves at least a first data portion of a first of the plurality of logical regions from a first of the plurality of storage tiers to a second of the plurality of storage tiers.

2. The method of claim 1, wherein said analyzing uses a first machine learning model to determine the predicted I/O access distribution.

3. The method of claim 2, wherein said determining the one or more logical regions further includes:
  determining, using a second machine learning model, groups of data portions having matching predicted I/O access characteristics for a same defined time period, wherein each of the groups is one of the plurality of logical regions.

4. The method of claim 1, wherein each of the plurality of storage tiers has associated storage tier characteristics including performance and capability characteristics of physical storage devices of said each storage tier.

5. The method of claim 4, wherein said determining a placement plan specifying placement of data portions of the plurality of logical regions among a plurality of storage tiers further includes:
  determining placement of data portions of each of the plurality of logical regions among the plurality of storage tiers in accordance with the predicted I/O access information for said each logical region and in accordance with the associated storage tier characteristics of each of the plurality of storage tiers.

6. The method of claim 4, wherein the plurality of storage tiers includes at least one tier of solid state storage devices and wherein the associated storage tier characteristics of said at least one tier includes at least one write endurance characteristic for solid state storage devices of said at least one tier.

7. The method of claim 6, wherein the at least one write endurance characteristic includes one or more of: a write endurance classification for solid state storage devices of said at least one tier, a number of remaining writes expected during a lifetime of a solid state device of said at least one tier, and a current write wear level of a solid state device of said at least one tier.

8. The method of claim 4, wherein the associated storage tier characteristics of said each tier includes a characteristic indicated a RAID (redundant array of independent disks) level of RAID groups of physical storage devices configured in said each storage tier.

9. The method of claim 1, wherein the placement plan is determined using a machine learning model.

10. The method of claim 1, wherein the plurality of logical regions includes at least the two logical regions of different sizes.

11. The method of claim 1, further comprising:
  providing a hint in accordance with the placement plan to a data storage optimizer, wherein the hint indicates that data portions of the first logical region should be stored on the second tier;
  determining, by the data storage optimizer, whether the first data portion of the first logical region is currently stored on the second storage tier; and
  responsive to determining that the first data portion of the first logical region is not currently stored on the second storage tier, moving, by the data storage optimizer, the first data portion from the first storage tier to the second storage tier.

12. The method of claim 1, wherein the plurality of storage tiers includes more than one solid state storage tier.

13. The method of claim 1, wherein the plurality of storage tiers includes at least one tier of rotating disk drives.

14. A non-transitory computer readable medium comprising code stored thereon that, when executed, performs data storage optimization processing comprising:
  receiving I/O access information characterizing observed I/O operations directed to a logical address space;
  analyzing the I/O access information to identify a predicted I/O access distribution expected for a plurality of logical regions of the logical address space at multiple points in time, wherein said analyzing includes:
    determining the predicted I/O access distribution for the logical address space at the multiple points in time; and
    determining, in accordance with the predicted I/O access distribution at the multiple points in time, one or more logical regions of the plurality of logical regions, and wherein each logical region of the one or more logical regions has predicted I/O access information characterizing I/O operations directed to said each logical region wherein each of the one or more logical regions includes data portions having matching predicted I/O access characteristics for a same defined time period, and wherein the predicted I/O access information of said each logical region is in accordance with the matching predicted I/O access characteristics of the data portions included in said each logical region;
  determining a placement plan specifying placement of data portions of the plurality of logical regions among a plurality of storage tiers; and
  performing, in accordance with the placement plan, at least one data movement that moves at least a first data portion of a first of the plurality of logical regions from a first of the plurality of storage tiers to a second of the plurality of storage tiers.

15. The non-transitory computer readable medium of claim 14, wherein said analyzing uses a first machine learning model to determine the predicted I/O access distribution.

16. A system comprising:
  a processor; and
  a memory comprising code stored thereon that, when executed, performs data storage optimization processing comprising:
    receiving I/O access information characterizing observed I/O operations directed to a logical address space;
    analyzing the I/O access information to identify a predicted I/O access distribution expected for a plurality of logical regions of the logical address space at multiple points in time, wherein said analyzing includes:
      determining the predicted I/O access distribution for the logical address space at the multiple points in time; and
      determining, in accordance with the predicted I/O access distribution at the multiple points in time, one or more logical regions of the plurality of logical regions, and wherein each logical region of the one or more logical regions has predicted I/O access information characterizing I/O operations directed to said each logical region, wherein each of the one or more logical regions includes data portions having matching predicted I/O access characteristics for a same defined time period, and wherein the predicted I/O access information of said each logical region is in accordance with the matching predicted I/O access characteristics of the data portions included in said each logical region;
    determining a placement plan specifying placement of data portions of the plurality of logical regions among a plurality of storage tiers; and performing, in accordance with the placement plan, at least one data movement that moves at least a first data portion of a first of the plurality of logical regions from a first of the plurality of storage tiers to a second of the plurality of storage tiers.

* * * * *